(12) United States Patent
Seaborn (10) Patent No.: US 11,863,669 B2
(45) Date of Patent: Jan. 2, 2024

(54) SESSION RESUMPTION WITH DERIVED KEY

(71) Applicant: INTERNATIONAL BUSINESS MACHINES CORPORATION, Armonk, NY (US)

(72) Inventor: Mark Duane Seaborn, Algonquin, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/656,787

(22) Filed: Mar. 28, 2022

(65) Prior Publication Data

US 2023/0308271 A1   Sep. 28, 2023

(51) Int. Cl.
*H04L 9/08* (2006.01)
*H04L 9/40* (2022.01)

(52) U.S. Cl.
CPC .......... *H04L 9/0869* (2013.01); *H04L 9/0872* (2013.01); *H04L 9/0877* (2013.01); *H04L 63/166* (2013.01)

(58) Field of Classification Search
CPC ... H04L 9/0869; H04L 9/0872; H04L 9/0877; H04L 63/166; H04L 63/068; H04L 63/04; H04L 63/0435; H04L 9/08; H04L 63/16
See application file for complete search history.

(56) References Cited

U.S. PATENT DOCUMENTS

| | | | |
|---|---|---|---|
| 8,904,482 B1* | 12/2014 | Dotan | H04L 63/0838 726/4 |
| 10,862,688 B2 | 12/2020 | Velikevitch | |
| 10,892,891 B2 | 1/2021 | Velikevitch | |
| 11,405,369 B1* | 8/2022 | Retyunskiy | H04L 9/3263 |
| 2010/0257434 A1* | 10/2010 | Harrison | H04L 9/0858 714/752 |
| 2013/0227286 A1 | 8/2013 | Brisson | |
| 2014/0289826 A1 | 9/2014 | Croome | |
| 2017/0034131 A1 | 2/2017 | Yotov | |
| 2017/0359843 A1 | 12/2017 | Bell | |
| 2020/0059373 A1* | 2/2020 | Norum | H04L 9/0897 |
| 2021/0167967 A1 | 6/2021 | Velikevitch | |
| 2021/0184860 A1 | 6/2021 | Velikevitch | |
| 2021/0281607 A1 | 9/2021 | Green | |
| 2022/0377060 A1* | 11/2022 | Livny | H04L 67/5683 |

FOREIGN PATENT DOCUMENTS

| | | |
|---|---|---|
| CN | 109120621 A | 1/2019 |
| CN | 112187804 A | 1/2021 |
| WO | 2020157454 A1 | 8/2020 |

OTHER PUBLICATIONS

Notification of Transmittal of the International Search Report and the Written Opinion of the International Searching Authority, or the Declaration, International Application No. PCT/CN2023/074066, dated May 17, 2023, 7 pgs.

* cited by examiner

*Primary Examiner* — Quazi Farooqui
(74) *Attorney, Agent, or Firm* — Scott S. Dobson (57) ABSTRACT

Session resumption for cryptographic communications is provided. Session data and encrypted early data are received from a client. A key is derived using the session data and a one-time pad. The early data is decrypted using the derived key.

20 Claims, 7 Drawing Sheets

SESSION RESUMPTION WITH DERIVED KEY

BACKGROUND

The present disclosure relates to cryptographic protocols for communications security over a computer network, and more specifically, to secure session resumption.

Cryptographic protocols provide secure connections, enabling two parties to communicate with privacy and data integrity. Example cryptographic protocols include Secure Sockets Layer (SSL) and Transport Layer Security (TLS). An SSL or TLS handshake enables the SSL or TLS client and server to establish the secret keys with which they will communicate.

SUMMARY

According to embodiments of the present disclosure, a computer-implemented method for session resumption for cryptographic communications is provided. The method includes receiving, from a client, session data and encrypted early data. A key is derived using the session data and a one-time pad. The early data is decrypted using the derived key.

According to further embodiments of the present disclosure, a system and a computer program product for performing the method are provided.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to secure connection session resumption for replay prevention and forward secrecy, and more particular aspects relate to deriving keys using one-time pads for 0-RTT session resumption. While the present disclosure is not necessarily limited to such applications, various aspects of the disclosure may be appreciated through a discussion of various examples using this context.

0-RTT (zero round-trip time) key exchange protocols enable a client to establish a key with a server without interaction, based only on material obtained in previous connections. This key can be used to encrypt early data, transmitted to the server before both parties interact further to establish a new key.

Transport Layer Security (TLS) version 1.3 provides a session resumption protocol that allows the client to store two versions of session keys, one which the client can choose to encrypt for themselves, and another encrypted in a ticket issued by the server at the end of the original TLS handshake. This ticket is encrypted with the server's key encryption key (KEK) that is only available to the server. Once the session has been completed, the server deletes the session key on the server side to protect the session from future breaches. At some point after the session has been completed, the client has the opportunity to resume the session. During 0-RTT session reestablishment in TLS 1.3, the client sends the ticket back in the first message to the server along with "early data" encrypted using the session key. The server can obtain the session key by decrypting the ticket using the server's KEK, allowing the server to decrypt the early data with the session key.

However, this creates an opportunity for an adversary to capture messages, such as reestablishment session transactions for bank withdrawals, then replay the sequence back to trick the server into performing the action multiple times. This also introduces a situation where, once server has been compromised and the KEK is discovered, all tickets that the server has issued have also been compromised. If the adversary has also previously captured a ticket for a client, it can decrypt the ticket and get the session key. This situation would risk previous sessions as the adversary can now decrypt session data that was previously captured because they have the original session key in the decryptable ticket. Further, the adversary can decrypt future session communication using the session key.

Embodiments of the present disclosure may provide for session resumption with replay prevention and forward secrecy by deriving a key for the session resumption independently by the client and the server. Instead of resuming a session with the previously-used session key, a new key may be derived independently by the client and by the server. Since the key is generated independently by the client and the server, it cannot be intercepted in a communication between the two. Further, since a new key is being used, if the key does end up being discovered, it cannot be used to decrypt previous communications that were encrypted using the previous session key. The key may be derived using keyed hashing function that uses a one-time pad that is generated based on time. Thus, a 0-RTT session resumption message with early data encrypted using the derived key would not be vulnerable to a replay attack because replaying the same message at a different time would result in the server generating a different key that would be unable to decrypt the early data in the message or the rest of the data stream. Instead, the server is forced to abort the session as it is unable to read any data related to the session. This approach solves the future secrecy protection problem because neither side retains a key that can be stolen and used to decrypt messages in the future. The original session key may be discarded after the first session and never reused, and each resumed session uses a new derived key.

According to embodiments, to perform a 0-RTT session resumption, the client derives a new key using session data and a one-time pad, encrypts early data using the derived key, and sends a message to the server including session data and the encrypted early data. Any suitable keyed hashing function and key size may be used for deriving the new key. The server may derive the new key on the server using the same keyed hashing function, the session data, and the one-time pad. The server can then decrypt the early data using the derived key.

Session data, as used herein, can be any data that the client and the server associate with the initial session. As described herein, the session data may be used as a message to be hashed with a one-time pad to derive a key. In some embodiments, the session data may be a value that is created and shared during the initial session that has a purpose outside of session reestablishment, such as a session ID or the initial session key. In some embodiments, session data may not have any other use than to be a value used to derive a session reestablishment key. For example, the session data may be a random or pseudo-random value that is generated by the server or the client.

In some embodiments, the session data may be communicated between the client and the server using session tickets encrypted using the server's KEK similar to those used in TLS 1.3. That is, during the initial TLS handshake, the server may send a ticket with the session data, encrypted using the server's KEK, to the client, and the client may return the ticket to the server, along with encrypted early data, to establish 0-RTT session resumption. As mentioned previously, the session data encrypted in the ticket may be the session key, such that the ticket is the same as the ticket used in TLS 1.3. However, as also mentioned previously, the session data encrypted in the ticket may be any other data that the server and the client associate with the transaction. Including the session key in the ticket may not be as secure as using other data, as it could break forward secrecy protection.

Figure 1:
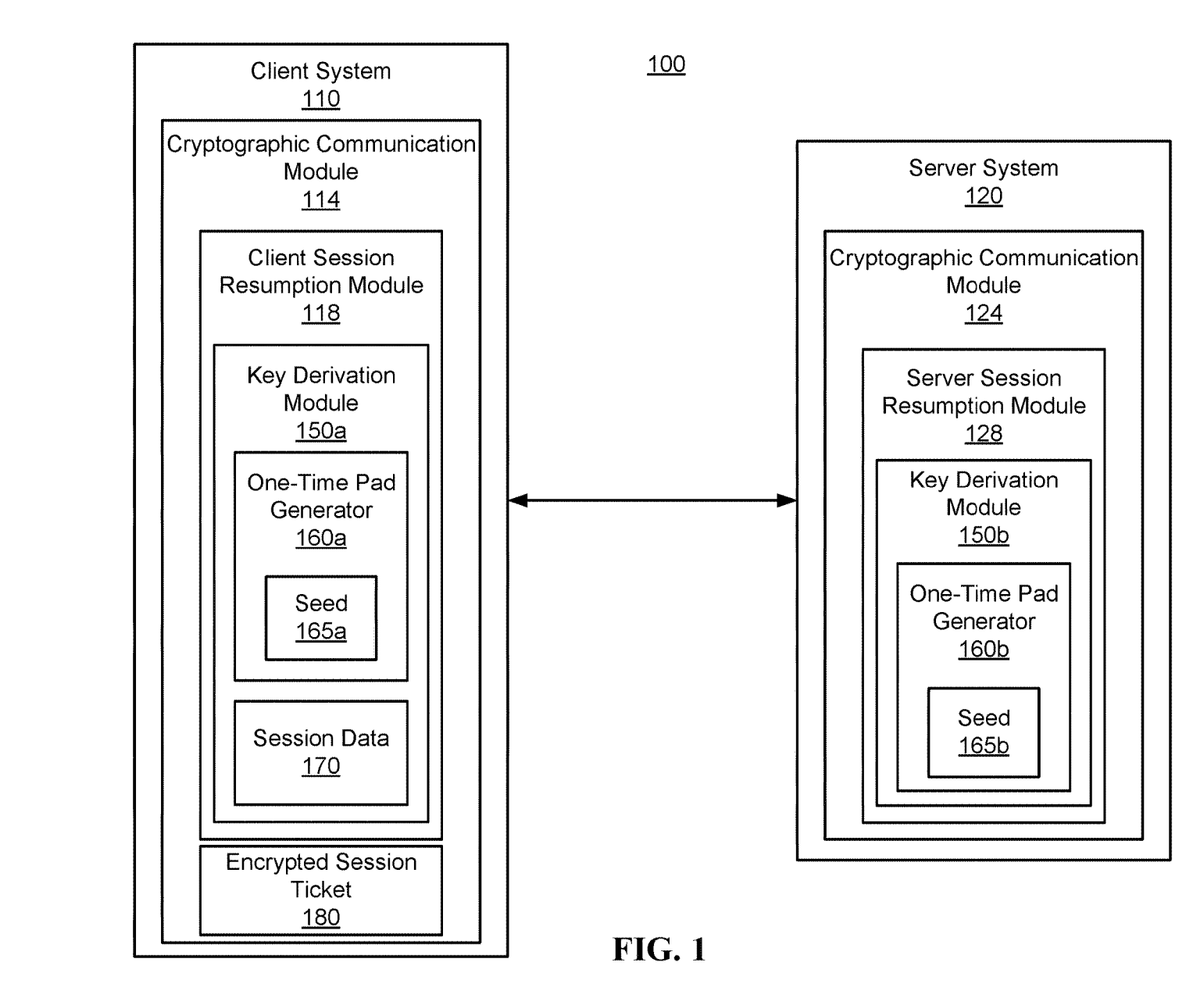
FIG. 1 depicts an example computing environment, according to embodiments.

Referring now to FIG. 1, an example computing environment 100 is depicted, according to embodiments. Computing environment 100 includes a client system 110 and a server system 120. Client system 110 and server system 120 may be implemented using any suitable computing device. For example, computer system 701 described in reference to FIG. 7 may be used as client system 110 or server system 120. While computing environment 100 only depicts one client system, server system 120 may be configured to communicate with any number of client systems. Client system 110 and server system 120 may communicate over one or more networks. The depicted modules may be a combination of hardware and software configured to perform one or more logical functions as described herein.

Client system 110 includes cryptographic communication module 114 configured to implement secure cryptographic communication sessions with server system 120. Cryptographic communication module 114 may be configured to perform operations to establish a TLS connection with server system 120. For example, cryptographic communication module 114 may be configured to perform a TLS handshake with server system 120 to establish a session key and send and receive messages with server system 120 encrypted with the session key.

Cryptographic communication module 114 includes a client session resumption module 118 configured to resume a cryptographic communication session with server system 120 that has previously ended. For example, client session resumption module 118 may be configured to perform 0-RTT TLS session reestablishment with server system 120. Client session resumption module 118 includes key derivation module 150a configured to derive a key for session resumption.

Key derivation module 150a is configured to derive a key for session resumption using a one-time pad generated by one-time pad generator 160a and session data 190. Key derivation module 150a may be configured to apply a hashing algorithm to the one-time pad and the session data 170 to derive a key. For example, key derivation module 150a may be configured to derive a 256 Advanced Encryption Standard (AES) key by applying a keyed hash function using the session data as a message to be hashed with the one-time pad as the key to the hash function. In some embodiments, an inflation algorithm may be needed to increase the size of the key after applying the keyed hash function. One-time pad generator 160a may be configured to generate one-time pads based on time, to be used by key derivation module 150a in deriving a key for session resumption. In some embodiments, one-time pad generator 160a may use seed 165a in addition to the time to generate one-time pads. As described herein, session data 170 may be any data associated with a previous session. Session data 170 may be stored by the client during the initial session with server system 120.

Client session resumption module 118 may be configured to send a session resumption message to server system 120 that includes early data encrypted with the derived key and session data. In some embodiments, the session data may be sent to server system 120 in the form of encrypted session ticket 180. Encrypted session ticket 180 may be sent to client system 110 by server system 120 during the initial cryptographic communication session. Encrypted session ticket 180 may include the same session data as session data 170. The session ticket may be encrypted by the server system's KEK such that the session ticket can only be decrypted by the server.

Server system 120 includes cryptographic communication module 124 configured to implement secure cryptographic communication sessions with client system 110. Cryptographic communication module 114 may be configured to perform operations to establish a TLS connection with client system 110. For example, cryptographic communication module 124 may be configured to perform a TLS handshake with client system 110 to establish a session key and send and receive messages with client system 110 encrypted with the session key. In some embodiments, cryptographic communication module 114 may be configured to generate a session ticket containing session data, encrypted with the server system's KEK, a send the session ticket to client system 110 to be used at a later time for session resumption.

Cryptographic communication module 124 includes a server session resumption module 128 configured to resume a cryptographic communication session with client system 110 that previously ended. For example, server session resumption module 128 may be configured to reestablish a session with client system 110 and decrypt early data. Server session resumption module 128 includes key derivation module 150b configured to derive a key for session resumption.

Key derivation module 150b may be configured to derive a key using essentially the same mechanism as key derivation module 150a. Key derivation module 150 is configured to derive a key for session resumption using a one-time pad generated by one-time pad generator 160b and session data received from client system 110. As described herein, the server system 120 may receive the session data from client system 110 in encrypted session ticket 180. Key derivation module 150b may be configured to apply the same keyed hashing function as key derivation module 150a to the session data using the one-time pad to derive a key. One-time pad generator 160b may be configured, using the same algorithm as one-time pad generator 160a, to generate one-time pads based on time, to be used by key derivation module 150b in deriving a key for session resumption.

In some embodiments, one-time pad generator 160b may use seed 165b in addition to the time to generate one-time pads. The seed 165b may be the same as seed 165a. The seed may be shared between client system 110 and server system 120 out of band with any cryptographic communication session. In some embodiments, client system 110 and server system 120 may share a seed during an initial registration process for the client with the server.

Although only one seed 165b is depicted, server system 120 may store any number of seeds corresponding to any number of clients. That is, each client may be associated with a unique seed that the server must use when generating a one-time pad for communication with the respective client. In some embodiments, the server may use the same seed 165b with multiple clients.

Alternatively, in some embodiments, the server may share the seed encrypted in a header or separate message as part of a TLS session negotiation process. The server could then either track all clients it had ever communicated with or use a mechanism to remove certain clients. For example, the server could track the seeds for clients in a cache. The cache could follow a number of rules to control the size of the cache, such as timing out older sessions as the cache grows too large.

In some embodiments, the client and server could use an Ephemeral Diffie-Hellman exchange to derive a seed for one-time pad for keying the hash function. This may require that the client and server agree to use Diffie-Hellman to derive the session seeds and could be communicated in the string that describe the security protocols to use for TLS. The string may be modified to add a section stating the session will use a Diffie-Helm derived key for session reestablishment and standard Ephemeral Diffie-Hellman parameters and exchanges would be used.

Figure 2:
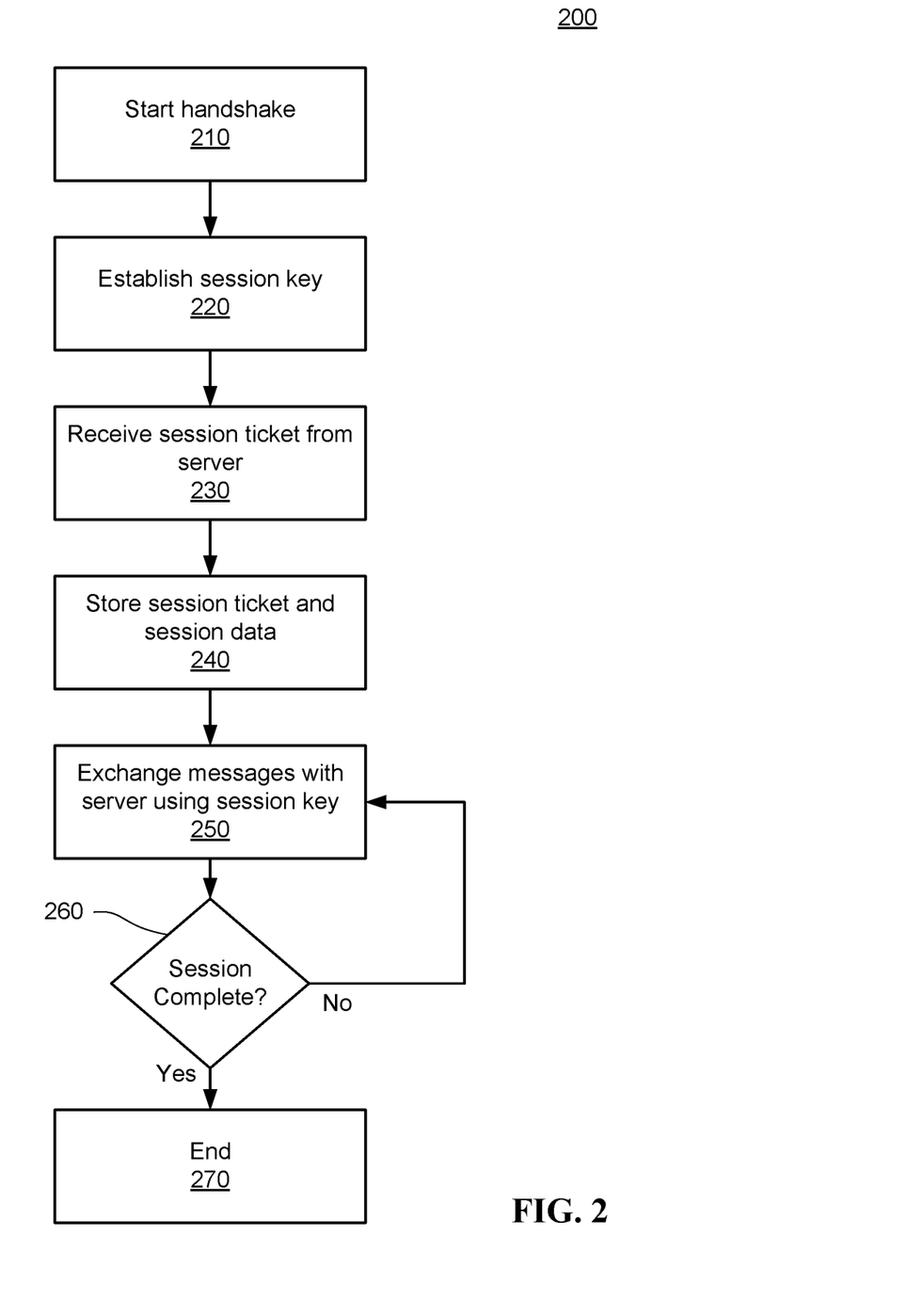
FIG. 2 depicts a flow diagram of an example method for a client establishing an initial cryptographic communication session with a server is depicted, according to embodiments.

Referring now to FIG. 2, a flow diagram of an example method 200 for a client establishing an initial cryptographic communication session with a server is depicted, according to embodiments. For example, method 200 may be performed by client system 110 described in reference to FIG. 1.

At operation 210, the client starts a handshake with the server. For example, the client may send a "client hello" message to the server to initiate a TLS handshake with the server.

At operation 220, a session key is established between the client and the server. For example, the client and the server may negotiate a session key according to a TLS handshake process.

At operation 230, a session ticket is received from the server. The session ticket may be sent to the client at the end of a TLS handshake with the server. The session ticket may include session data as described herein. Further, the session ticket may be encrypted using the server's KEK. Additionally, the server may send the session data unencrypted or encrypted using the session key to let the client know what session data is being used for the session. Alternatively, the session data may be data that was previously exchanged between the client and the server. Additionally, the seed used for generating a one-time pad may be received from the server in this operation if it has not previously been provided to the client. Alternatively, this seed may be shared between the client and the server out of band, independent of any cryptographic communication session.

At operation 240, the client stores the session ticket and session data such that it can be used to resume the session at a later time once the session is complete. The session ticket may already be encrypted using the server's KEK, but the client may further encrypt the session ticket for storage. Additionally, the client may encrypt the session data for storage. Further, the seed may be stored for generating the one-time pad.

At operation 250, the client exchanges messages with the server using the session key. For example, the client and the server may each send and receive messages encrypted using the session key.

At operation 260, the client determines whether the cryptographic communication session is complete. For example, the client may decide to end the session or may receive a communication from the server to end the session. If the session is not complete, the client may continue to exchange messages with the server at operation 250. If the session is complete, the method may end at operation 270.

Figure 3:
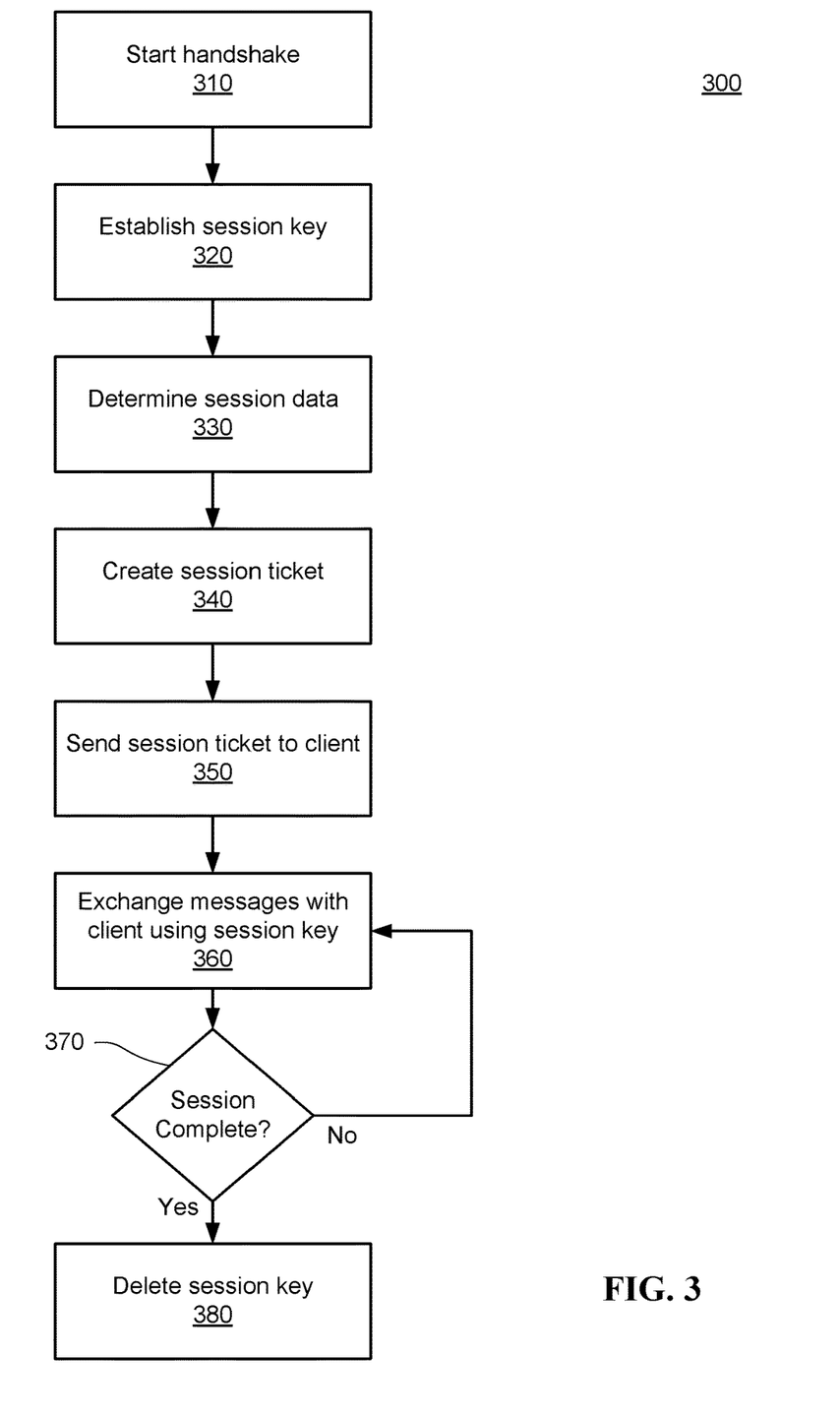
FIG. 3 depicts a flow diagram of an example method for a server establishing an initial cryptographic communication session with a client is depicted, according to embodiments.

Referring now to FIG. 3, a flow diagram of an example method 300 for a server establishing an initial cryptographic communication session with a client is depicted, according to embodiments. For example, method 300 may be performed by server system 120 described in reference to FIG. 1.

At operation 310. the server starts a handshake with the client. For example, the server may receive a "client hello" message from the client to initiate a TLS handshake with the server, and the server may send a "server hello" message back to the client.

At operation 320, a session key is established between the client and the server. For example, the server and the client may negotiate a session key according to a TLS handshake process.

At operation 330, session data may be determined by the server. In some embodiments, the session data may be a value that is created during the handshake process. For example, the session data may be the session key or may be a session ID. In some embodiments, the session data may be a random or pseudo-random value that is generated by the server. In some embodiments, the session data may be chosen by the client device and communicated to the server.

At operation 340, a session ticket is created using the session data. The session ticket may include the session data and any other information regarding the session. The session ticket may be encrypted using the server's KEK such that it can only be decrypted by the server.

At operation 350, the session ticket is sent to the client. The session ticket may be sent to the client at the end of a TLS handshake. In some embodiments, the server may also send the client the session data unencrypted or encrypted using the session key. Additionally, the server may send the client a seed for generating a one-time pad for deriving session resumption key if it has not already been shared.

At operation 360, the server exchanges messages with the client using the session key. For example, the client and the server may each send and receive messages encrypted using the session key.

At operation 370, the server determined whether the session is complete. For example, the server may decide to end the session or may receive a communication from the client to end the session. If the session is not complete, the server may continue to exchange messages with the client at operation 360. If the session is complete, the server may delete the session key at operation 380 to protect the session communications on the server side.

Figure 4:
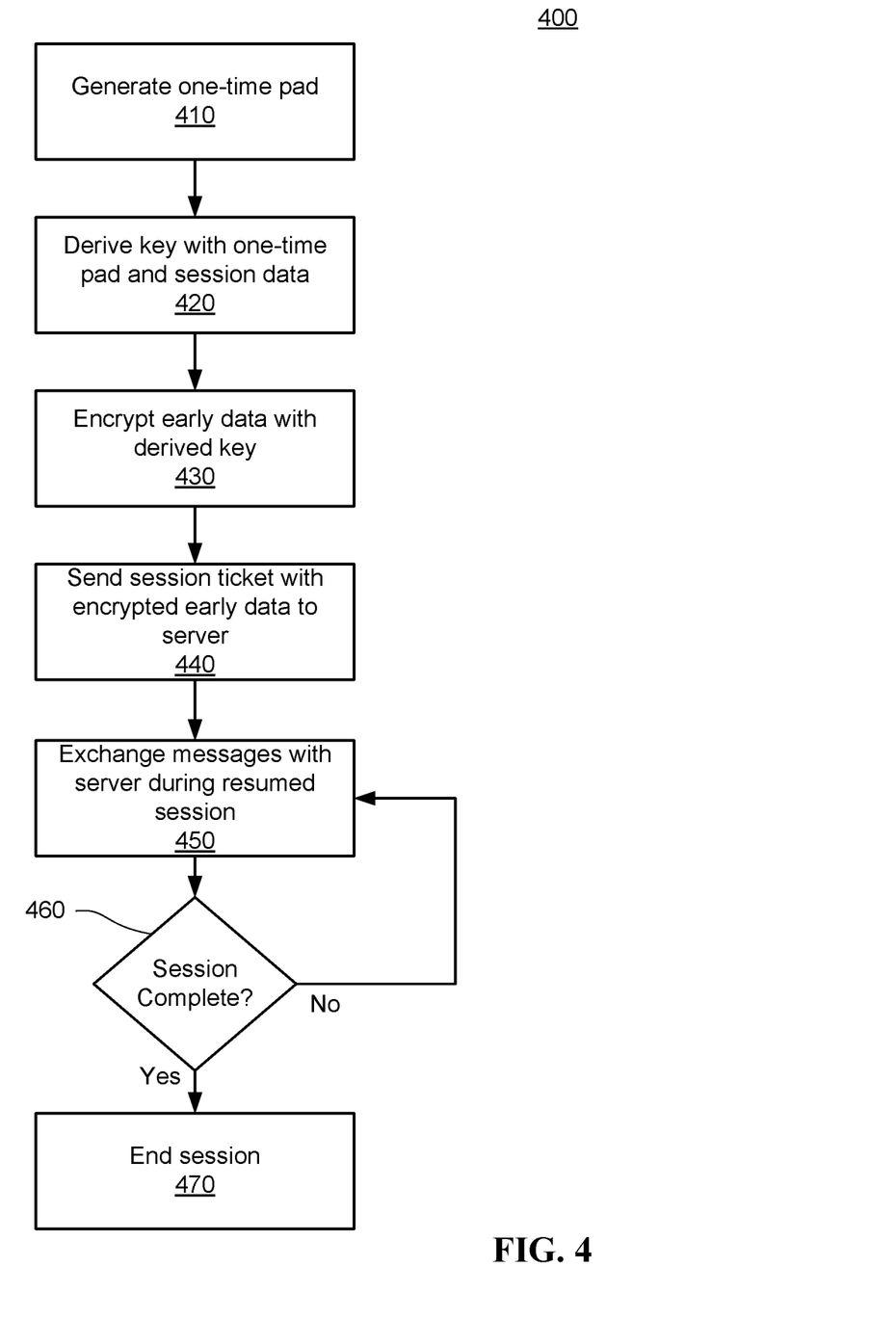
FIG. 4 depicts a flow diagram of an example method for a client resuming a cryptographic communication session with a server is depicted, according to embodiments.

Referring now to FIG. 4, a flow diagram of an example method 400 for a client resuming a cryptographic communication session with a server is depicted, according to embodiments. For example, method 400 may be performed by client system 110 described in reference to FIG. 1.

At operation 410, the client generates a one-time pad. The one-time pad may be generated using any suitable algorithm. As described herein, the algorithm may need to be the same algorithm that is used by the server. The one-time pad may be generated based on the current time. For example, the one-time pad algorithm may use the system clock as a source of uniqueness to create a unique one-time pad based on the time. Additionally, the algorithm may utilize a seed in addition to the current time. The seed may be any value that is shared between the client and the server. This seed value may be shared between the client and the server during an initial registration process between the client and the server, outside of any cryptographic communication session. The seed may be unique to the client.

At operation 420, the client derives a key using the one-time pad and session data associated with the previous session. For example, the client may derive a 256 Advanced Encryption Standard (AES) key by applying a keyed hash function (HMAC) using the session data as a message to be hashed with the one-time time pad as the key to the hash function. As described herein, the session data may be any data associated with the previous session.

At operation 430, the client encrypts early data with the derived key. The early data may be any data the client may send to the server using a cryptographic communication session.

At operation 440, the client sends a session ticket and the encrypted early data to the server. As described herein, the session ticket may include the session data associated with the previous session and may be encrypted using the server's KEK.

At operation 450, the client may continue to exchange messages with the server during the resumed session. The messages may continue to be encrypted using the derived key. In some embodiments, the client and the server may negotiate a new key for future communications. Additionally, the server may create a new session ticket and session data to use for future resumption of the session and the client may receive these from the server.

At operation 460, the client determines whether the resumed cryptographic communication session is complete. For example, the client may decide to end the session or may receive a communication from the server to end the session. If the session is not complete, the client may continue to exchange messages with the server at operation 450. If the session is complete, the method may end at operation 470.

Figure 5:
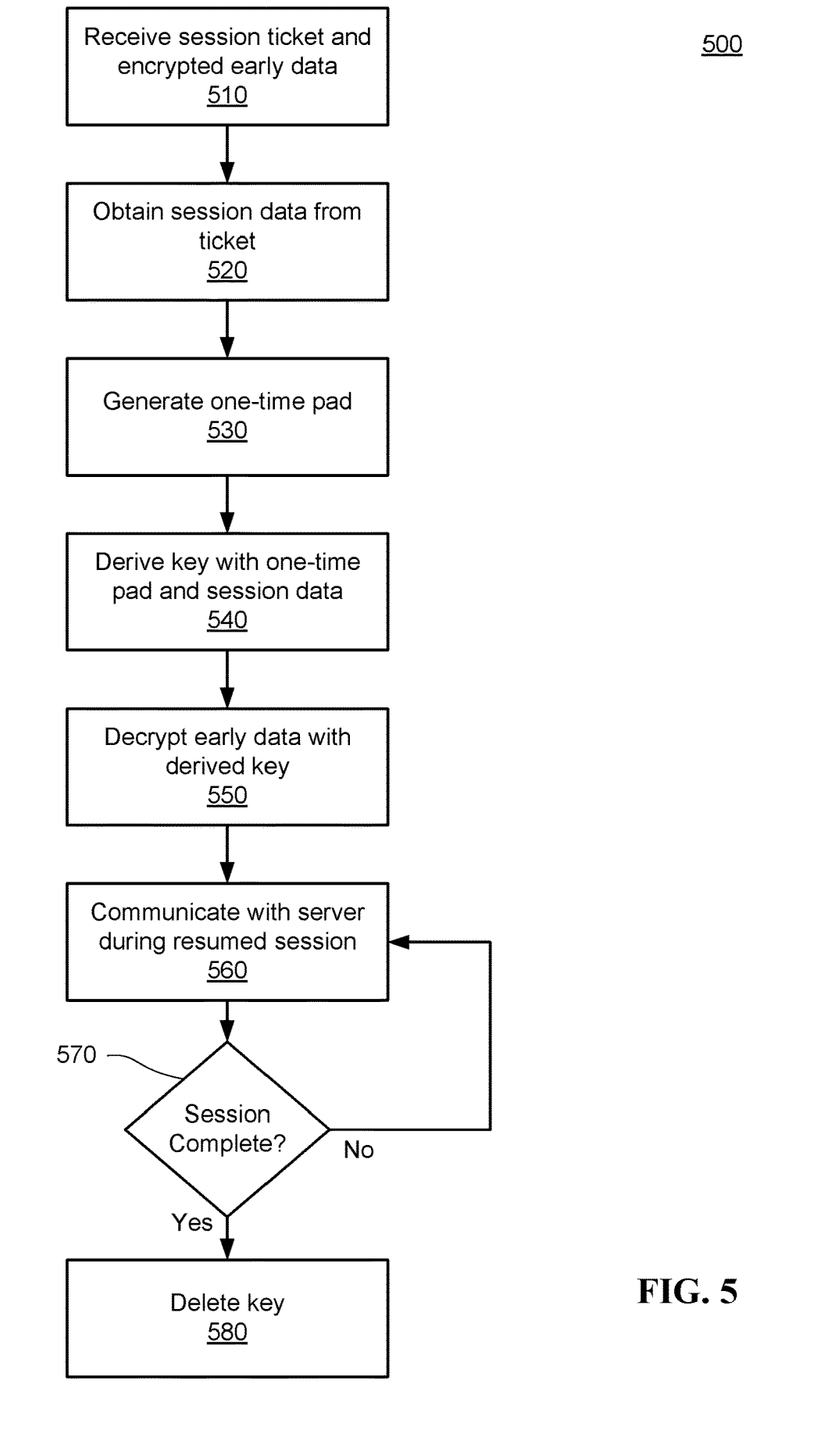
FIG. 5 depicts a flow diagram of an example method for a server resuming a cryptographic communication session with a client is depicted, according to embodiments.

Referring now to FIG. 5, a flow diagram of an example method 500 for a server resuming a cryptographic communication session with a client is depicted, according to embodiments. For example, method 500 may be performed by server system 120 described in reference to FIG. 1.

At operation 510, the server receives a session ticket and encrypted early data from the client. As described herein, the session ticket may include session data associated with the previous session and may be encrypted using the server's KEK.

At operation 520, the server obtains the session data from the session ticket. For example, the server may decrypt the session ticket using the server's KEK to produce the session data.

At operation 530, the server may generate a one-time pad. As described herein, the algorithm may need to be the same algorithm that is used by the client. The one-time pad may be generated based on the current time. For example, the one-time pad algorithm may use the system clock as a source of uniqueness to create a unique one-time pad based on the time. Additionally, the algorithm may utilize a seed in addition to the current time. The seed may be any value that is shared between the client and the server. This seed value may be shared between the client and the server during an initial registration process between the server and the client, outside of any cryptographic communication session. The server may store different seeds for different clients. Thus, in these embodiments, the server would use the seed associated with the client.

At operation 540, the server derives a key using the one-time pad and the session data associated with the previous session from the session ticket. The key may be derived using any suitable algorithm. As described herein, the algorithm may be the same algorithm that is used by the client. For example, a 256 AES key may be derived by applying a keyed hash function using the session data as a message to be hashed with the one-time time pad as the key to the hash function.

In some embodiments, some or all of operations 530 and 540 may be performed within a hardware security module (HSM) of the server for enhanced security. For example, the one-time pad generation algorithm and/or the key derivation algorithm may be contained within a tamper-proof HSM. Further, the seed may also be stored within the HSM.

At operation 550, the server decrypts the early data using the derived key.

At operation 560, the server communicates with the client during the resumed session. The messages may continue to be encrypted using the derived key. In some embodiments, the client and the server may negotiate a new key for future communications. Additionally, the server may create a new session ticket and session data to use for future resumption of the session and the client may receive these from the server.

At operation 570, the server determines whether the resumed cryptographic communication session is complete. For example, the server may decide to end the session or may receive a communication from the client to end the session. If the session is not complete, the client may continue to exchange messages with the server at operation 570. If the session is complete, the server may delete the derived key and/or any new key that was negotiated for the resumed session at operation 580.

Figure 6:
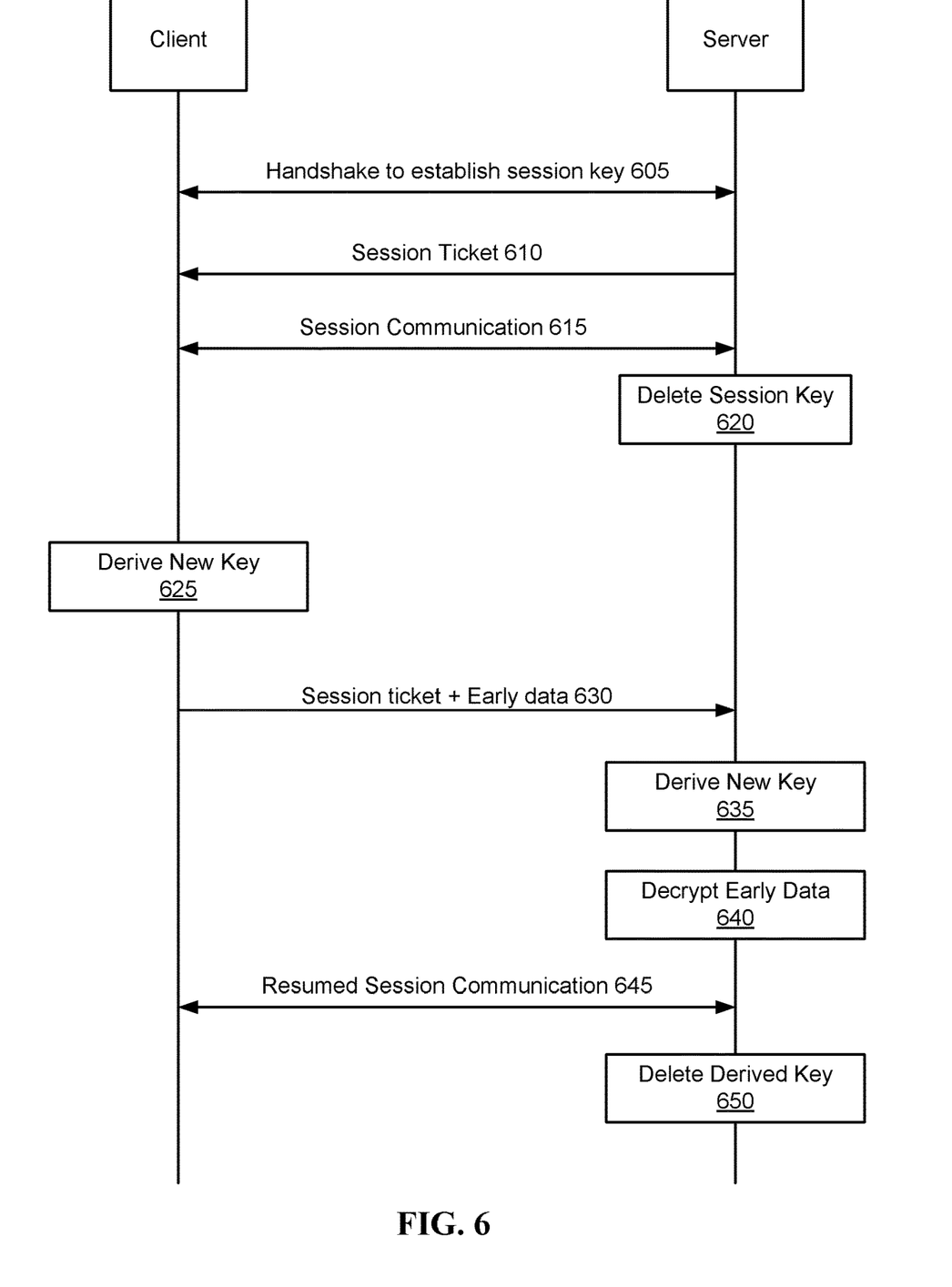
FIG. 6 depicts a sequence diagram of a cryptographic communication session is depicted, according to embodiments.

Referring now to FIG. 6, a sequence diagram of a cryptographic communication session is depicted, according to embodiments. At operation 605, the client and the server perform a handshake to establish a session key. At operation 610, the server sends a session ticket to the client. At operation 615, the client and the server communicate using messages encrypted with the session key. Once the session has ended, the server deletes the session key at operation 620. At operation 625, the client derives a new key to be used for 0-RTT session resumption. At operation 630, the client sends the session ticket and early data encrypted using the derived key to the server. At operation 635, the server derives the new key. At operation 640, the server decrypts the early data using the derived key. At operation 645, the client and the server communicate messages during the resumed session. Once the resumed session has ended, the server deletes the derived key at operation 650.

Figure 7:
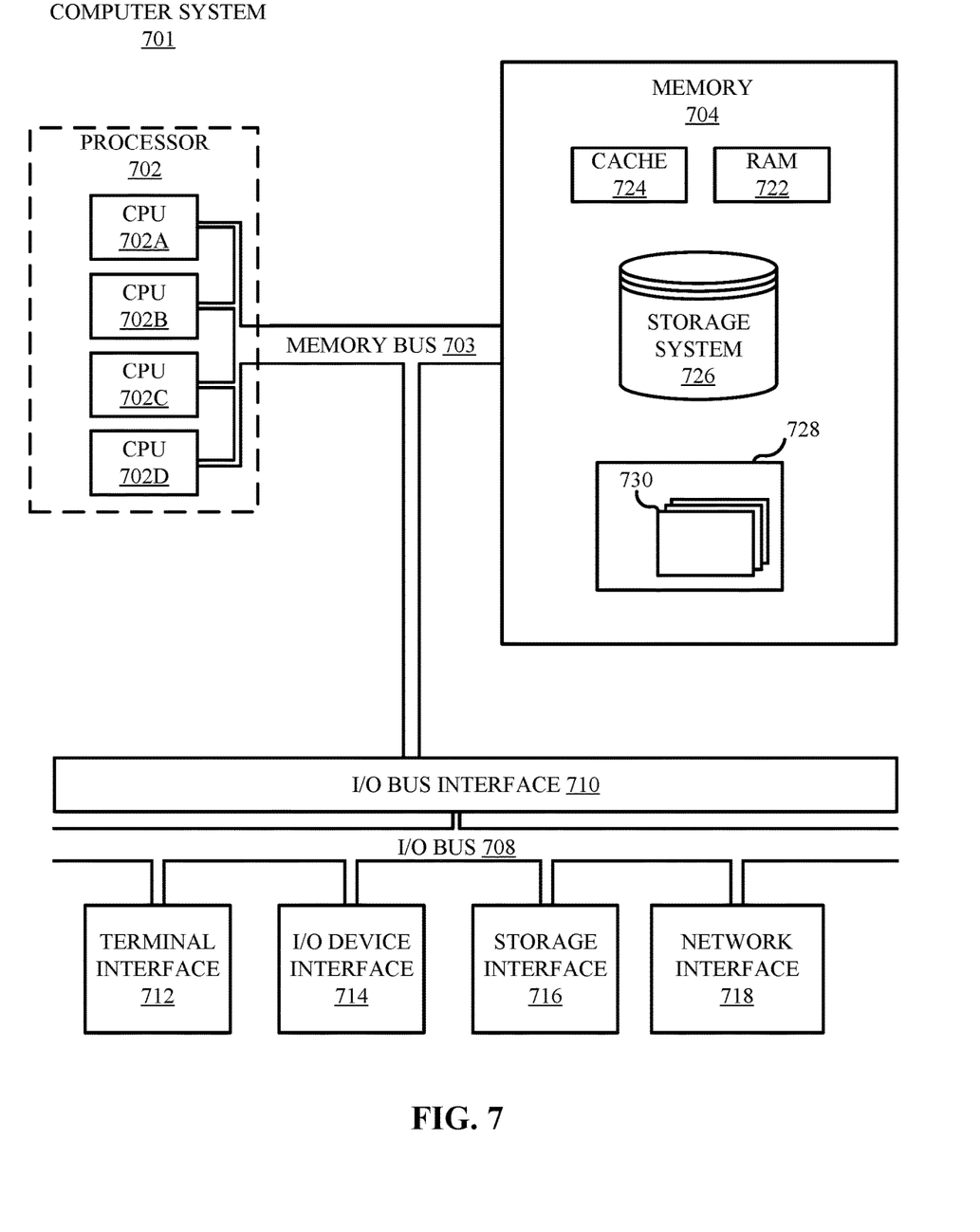
FIG. 7 depicts a high-level block diagram of an example computer system, according to embodiments.

Referring now to FIG. 7, shown is a high-level block diagram of an example computer system 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for session resumption for cryptographic communications, the method comprising:
    receiving, from a client, session data and encrypted early data;
    deriving a key using the session data and a one-time pad; and
    decrypting the early data using the derived key.

2. The method of claim 1, further comprising generating the one-time pad based on a current time.

3. The method of claim 2, wherein the one-time pad is further generated based on a seed shared with the client.

4. The method of claim 1, wherein the session data is received in an encrypted session ticket, the method further comprising decrypting the session ticket to produce the session data.

5. The method of claim 1, wherein deriving the key using the session data and the one-time pad is performed using a hardware security module.

6. The method of claim 1, wherein the deriving the key is performed by applying a hashing algorithm to the session data and the one-time pad.

7. The method of claim 1, further comprising:
    establishing a cryptographic communication session with the client using a session key;
    determining the session data to associate with the cryptographic communication session;
    generating a session ticket with the session data, the session ticket encrypted using a server's key encryption key (KEK);
    sending the session ticket to the client; and
    in response to ending the cryptographic communication session, deleting the session key, wherein the receiving, from the client, the session data and encrypted early data occurs after ending the cryptographic communication session, and wherein receiving the session data from the client includes receiving the session ticket from the client.

8. The method of claim 1, wherein the cryptographic communications are performed using a Transport Layer Security (TLS) protocol.

9. A system for session resumption for cryptographic communications, the system comprising:
    one or more computer readable storage media having program instructions embodied therewith; and
    one or more processors configured to execute the program instructions to perform operations comprising:
        receiving, from a client, session data and encrypted early data;
        deriving a key using the session data and a one-time pad; and
        decrypting the early data using the derived key.

10. The system of claim 9, wherein the operations further comprise generating the one-time pad based on a current time.

11. The system of claim 10, wherein the one-time pad is further generated based on a seed shared with the client.

12. The system of claim 9, wherein the session data is received in an encrypted session ticket, and wherein the operations further comprise decrypting the session ticket to produce the session data.

13. The system of claim 9, further comprising a hardware security module, wherein deriving the key using the session data and the one-time pad is performed by the hardware security module.

14. The system of claim 9, wherein the deriving the key is performed by applying a hashing algorithm to the session data and the one-time pad.

15. The system of claim 9, wherein the operations further comprise:
    establishing a cryptographic communication session with the client using a session key;
    determining the session data to associate with the cryptographic communication session;
    generating a session ticket with the session data, the session ticket encrypted using a server's key encryption key (KEK);
    sending the session ticket to the client; and
    in response to ending the cryptographic communication session, deleting the session key, wherein the receiving, from the client, the session data and encrypted early data occurs after ending the cryptographic communication session, and wherein receiving the session data from the client includes receiving the session ticket from the client.

16. The system of claim 9, wherein the cryptographic communications are performed using a Transport Layer Security (TLS) protocol.

17. A computer program product comprising one or more computer readable storage media having program instructions embodied therewith, the program instructions executable by one or more processors to cause the one or more processors to perform operations comprising:
    receiving, from a client, session data and encrypted early data;
    deriving a key using the session data and a one-time pad; and
    decrypting the early data using the derived key.

18. The computer program product of claim 17, wherein the operations further comprise generating the one-time pad based on a current time.

19. The computer program product of claim 18, wherein the one-time pad is further generated based on a seed shared with the client.

20. The computer program product of claim 17, wherein the session data is received in an encrypted session ticket, and wherein the operations further comprise decrypting the session ticket to produce the session data.

* * * * *